US005342158A

United States Patent [19]

Isaacson

[11] Patent Number: 5,342,158

[45] Date of Patent: Aug. 30, 1994

[54] HANDLING AND DEPLOYING RADIOACTIVE SOURCES

[75] Inventor: Chris A. Isaacson, Poway, Calif.

[73] Assignee: Gamma-Metrics, San Diego, Calif.

[21] Appl. No.: 9,800

[22] Filed: Jan. 27, 1993

Related U.S. Application Data

[63] Continuation-in-part of Ser. No. 954,306, Sep. 30, 1992, abandoned.

[51] Int. Cl.$^5$ ........................ B65G 65/00; G21C 19/00

[52] U.S. Cl. ........................ 414/146; 29/723; 376/272; 414/786

[58] Field of Search ........................ 414/146, 786; 254/134.3 FT; 29/723; 376/272, 264; 252/633

[56] References Cited

U.S. PATENT DOCUMENTS

| | | | |
|---|---|---|---|
| 4,259,153 | 3/1981 | Pryamilov et al. | 414/146 X |
| 4,277,680 | 7/1981 | Rodriguez et al. | 376/272 X |
| 4,277,688 | 7/1981 | Yamamoto et al. | 376/272 X |
| 4,673,545 | 6/1987 | Cooke et al. | 414/146 X |
| 4,761,107 | 8/1988 | Frantti | 414/146 |
| 4,942,661 | 7/1990 | Höger et al. | 414/146 X |
| 4,961,900 | 10/1990 | Hummel | 376/272 |
| 5,011,651 | 4/1991 | Hardt et al. | 414/146 X |

*Primary Examiner*—David A. Bucci
*Attorney, Agent, or Firm*—Edward W. Callan

[57] ABSTRACT

A radioactive source is mounted at one end of a rod and a ball-shaped coupler is disposed at the other end of the rod. An apparatus for handling a plurality of radioactive sources respectively mounted at one end of a plurality of rods having a ball-shaped coupler disposed at the other end of each said rod includes a shaft having a canister at one end of the shaft and a clip at another position on the shaft. The canister defines a plurality of compartments for respectively receiving a plurality of said mounted radioactive sources. The clip defines a plurality of chambers for respectively receiving a plurality of the ball-shaped couplers. The rods are flexible and semirigid and the distance between the canister and the clip is such in relation to the distance between the radioactive source and the ball-shaped coupler on the rod that the rods must be flexed after the radioactive sources are received in the compartments in order to insert the ball-shaped couplers into the chambers of the clip. The shaft also is flexible and semirigid so that both the rods and the shaft will bend when the canister is inserted through a curved passageway leading to a given location in a shielded enclosure. An apparatus for handling a single radioactive source includes a rod having the radioactive source mounted at one end of the rod; a ball-shaped coupler disposed at the other end of the rod; and a shaft having a clip at one end of the shaft defining a chamber for receiving the ball-shaped coupler.

15 Claims, 2 Drawing Sheets

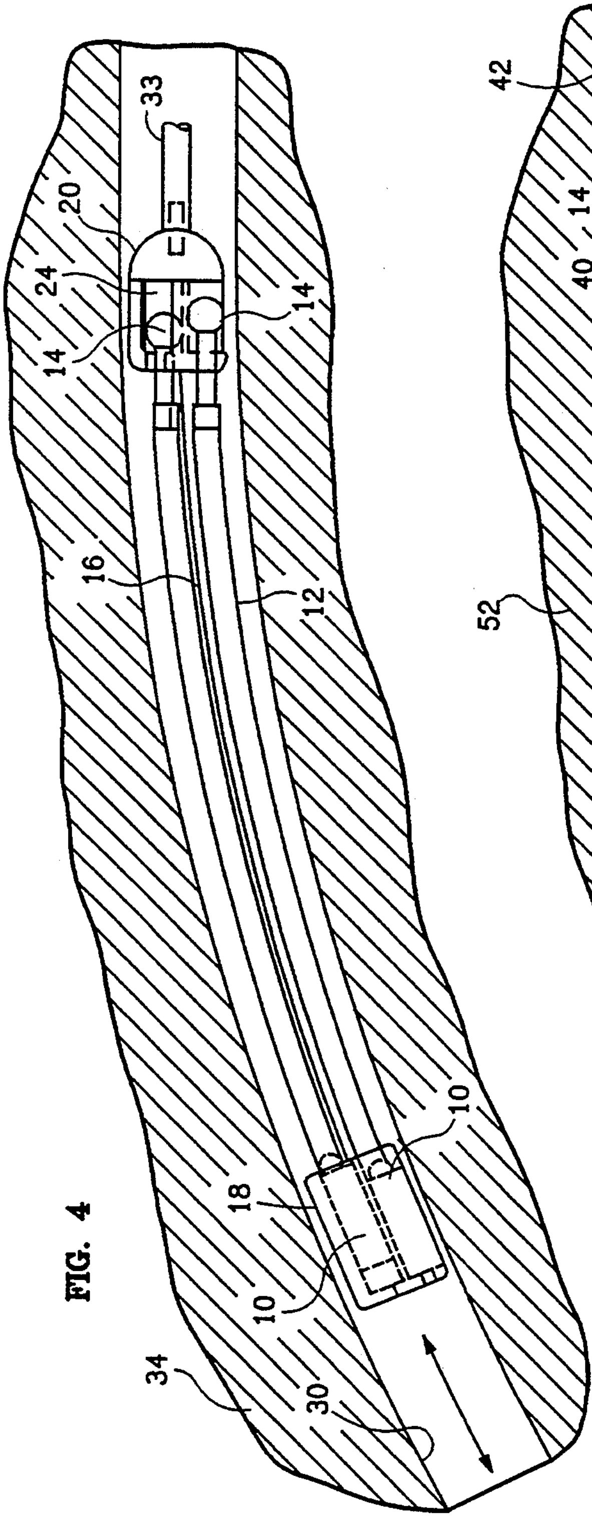
FIG. 4
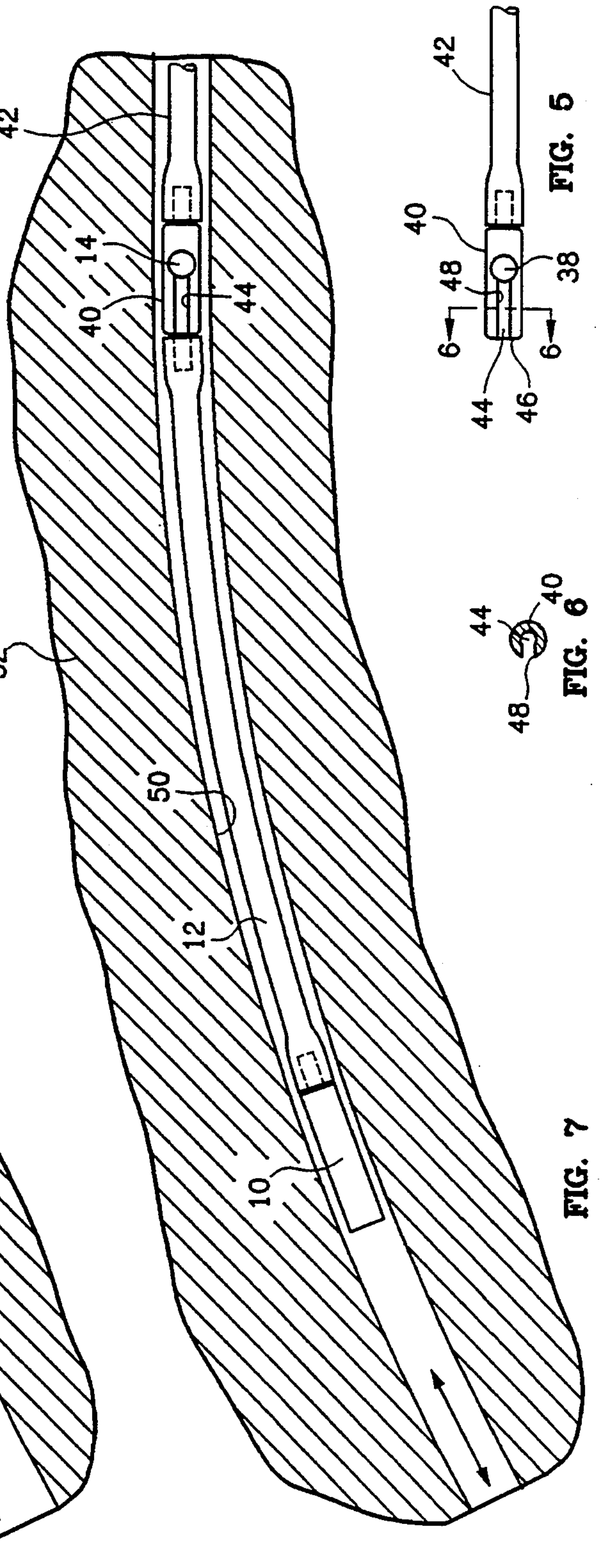
FIG. 7
FIG. 5
FIG. 6

HANDLING AND DEPLOYING RADIOACTIVE SOURCES

CROSS-REFERENCE TO RELATED APPLICATION

This Is a continuation-in-part of U.S. Pat. application No. 07/954,306 filed Sep. 30, 1992.

BACKGROUND OF THE INVENTION

The present invention generally pertains to handling and deployment of radioactive sources and is particularly directed to apparatus and a methods for handling radioactive sources for deployment of the radioactive sources from a first shielded enclosure to a second shielded enclosure.

In the prior art, a radioactive source, such as Cf-252, is deployed from a first shielded enclosure in which the source is stored to a second shielded enclosure in which the source is used by removing the source from the first shielded enclosure with tongs, inserting the source into a aster tethered on a thin limp cable, and lowering the canister to a given location in the second shielded enclosure through a curved vertically inclined tubular passageway in the second shield enclosure. The passageway is curved to prevent streaming of neutrons out of the passageway and is vertically inclined to the given location so that the tethered source can be lowered by gravity to the given location in the second shielded enclosure.

SUMMARY OF THE INVENTION

The present invention provides for efficient and safe simultaneous handling and deployment of a plurality of radioactive sources from a first shielded enclosure to a second shielded enclosure.

The present invention provides an apparatus for handling a plurality of radioactive sources respectively mounted at one end of a plurality of rods, wherein a coupler is disposed at the other end of each rod, the apparatus comprising a shaft having a canister defining a plurality of compartments at one end of the shaft for respectively receiving a plurality of said mounted radioactive sources, and a clip at another position on the shaft defining a plurality of chambers for respectively receiving a plurality of said couplers, such that the mounted radioactive sources are restrained to remain in the compartments when the couplers are received in said chambers.

The present invention also provides an apparatus for handling a plurality of radioactive sources, comprising a plurality of rods, each having a mounting for receiving a radioactive source at one end of the rod and a coupler at the other end of the rod; a shaft having a canister defining a plurality of compartments at one end of the shaft for respectively receiving a plurality of said mounted radioactive sources, and a clip at another position on the shaft defining a plurality of chambers for respectively receiving a plurality of said couplers, such that the mounted radioactive sources are restrained to remain in the compartments when the couplers are received in said chambers.

The present invention additionally provides an apparatus for handling a radioactive source, comprising a rod having the radioactive source mounted at one end of the rod; and a coupling means disposed at the other end of the rod for coupling to a clip disposed on a shaft that has a canister disposed at one end of the shaft for receiving the radioactive source.

The apparatus of the present invention thus enables radioactive sources to be deployed to a given location in a shielded enclosure by pushing the cannister-contained radioactive sources while handling the clip-end of the apparatus so that the radioactive sources can be deployed through a passageway that is not necessarily vertically inclined to the given location.

The present invention further provides a method of simultaneously handling a plurality of radioactive sources for deployment of the radioactive sources from a shielded enclosure, comprising the steps of: a) providing a plurality of radioactive sources respectively mounted at one end of a plurality of rods, wherein a coupler is disposed at the other end of each rod; b) handling the other ends of the rods outside of the shielded enclosure while the mounted radioactive sources are within the shielded enclosure to respectively insert the mounted radioactive sources in a plurality of compartments that are defined by a canister connected by a shaft to a clip defining a plurality of chambers for respectively receiving a plurality of said couplers, such that the mounted radioactive sources are restrained to remain in the compartments when the couplers are received in said chambers; and c) inserting the couplers into said chambers to prevent removal of the mounted radioactive sources from the compartments.

The present invention also provides an apparatus for handling a radioactive source, comprising a rod having the radioactive source mounted at one end of the rod; a coupler disposed at the other end of the rod; and a shaft having a clip at one end of the shaft defining a chamber for receiving said coupler; wherein the rod and the shaft are flexible and semirigid so that both the rod and shaft will flex when the rod and the shaft are inserted through a curved passageway leading to a given location in a shielded enclosure and thereby enable the radioactive source to be deployed through the curved passageway to and from the given location in the shielded enclosure.

The present invention further, provides a method of handling a radioactive source for deployment of the radioactive source from a shielded enclosure, comprising the steps of: a) providing a radioactive source mounted at one end of a rod, wherein a coupler is disposed at the other end of the rod; b) handling the other end of the rod outside of the shielded enclosure while the mounted radioactive source is within the shielded enclosure to insert the coupler into a chamber defined by a clip mounted at one end of a shaft; and c) handling the shaft to deploy the radioactive source to a given location in a second shielded enclosure through a curved passageway in the second shielded enclosure; wherein the rod and the shaft are flexible and semirigid so that both the rod and shaft will flex when the rod and the shaft are inserted through the curved passageway leading to the given location in the second shielded enclosure and thereby enable the radioactive source to be deployed through the curved passageway to the given location in the shielded enclosure.

Additional features of the present invention are described in relation to the detailed description of the preferred embodiment.

BRIEF DESCRIPTION OF THE DRAWING

FIG. 4 illustrates the use of the apparatus of FIG. 1 to deploy a plurality of radioactive sources through a curved passageway.

FIG. 5 illustrates a shaft and clip that may be combined with a mounted radioactive source as shown in FIG. I for handling and deploying the mounted radioactive source in accordance with an alternative preferred embodiment of the present invention.

FIG. 6 is a sectional view of the clip of FIG. 5 taken along line 6—6.

FIG. 7 illustrates the use of the apparatus of FIG. 5 to deploy a mounted radioactive source through a curved passageway.

DETAILED DESCRIPTION

Figure 1:
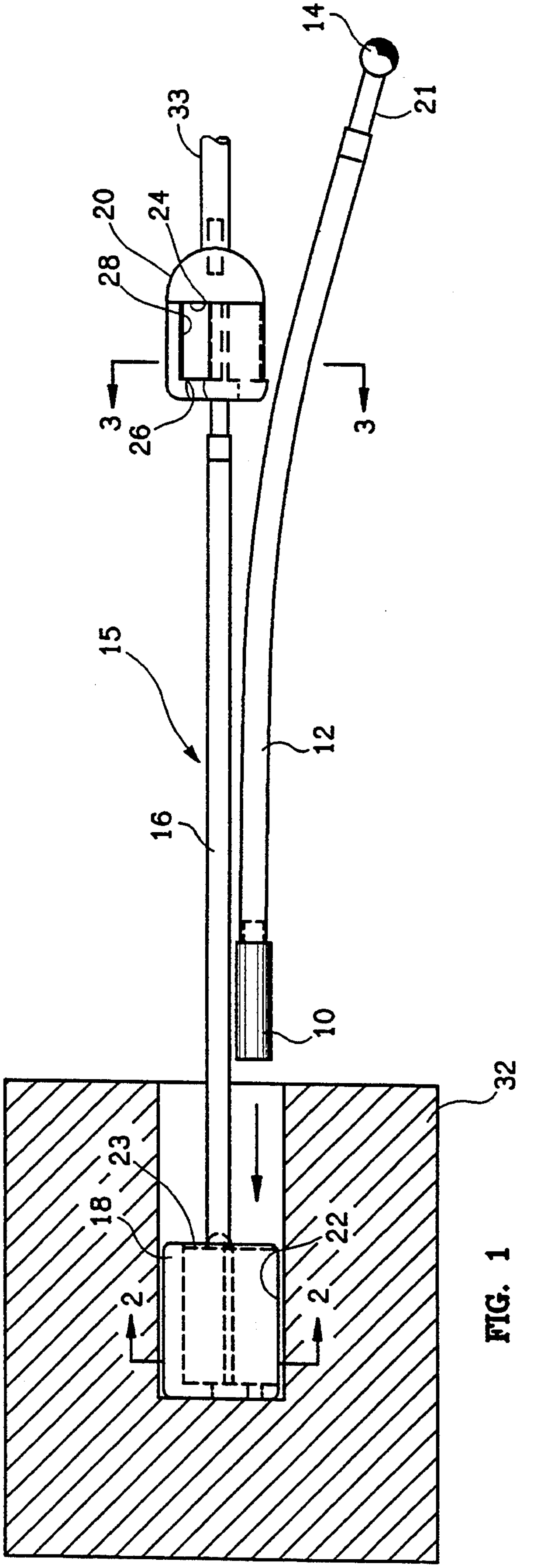
FIG. 1 illustrates one preferred embodiment of an apparatus according to the present invention for simultaneously handling and deploying a plurality of radioactive sources.
Figure 3:
FIG. 3 is a sectional view of the clip of the apparatus of FIG. 1 taken along line 3—3.
Figure 2:
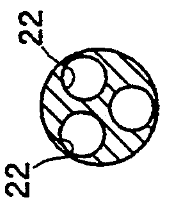
FIG. 2 is a sectional view of the caster of the apparatus of FIG. 1 taken along line 2—2.

In one preferred embodiment of the present invention a radioactive source 10 Is mounted at one end of a rod 12 and a ball-shaped coupler 14 is disposed at the other end of the rod 12; and an apparatus 15 for handling a plurality of said radioactive sources 10 respectively mounted at one end of a plurality of said rods 12 having a ball-shaped coupler 14 disposed at the other end of each said rod 12 includes a shaft 16 having a canister 18 at one end of the shaft 16 and a clip 20 at another position on the shaft 16. The ball shaped coupler 14 is connected to the red 12 by a neck 21, which has a smaller diameter than the ball shaped coupler 14.

The caster 18 defines a plurality of compartments 22 for respectively receiving a plurality of said mounted radioactive sources 10. The compartments 22 are cylindrical, with their axes parallel to the axis of the caster 18. The compartments 18 each define a countersunk opening 23 at the end of the canister facing the clip 20. The compartments 22 are slightly larger than the radioactive sources 10 both in diameter and length.

The clip 20 defines a plurality of chambers 24 for respectively receiving a plurality of said ball-shaped couplers 14. Each chamber 24 defines an opening 26 for receiving the neck 21 at the end of the chamber 24 facing the canister 18. The chamber 24 is dimensioned for enabling movement of the coupler 14 in the chamber 24 toward and away from said opening 26. There are openings 28 along the sides of the chamber 24. The openings 28 are slightly smaller than the diameter of the ball shaped coupler 14. The ball-shaped coupler 14 can be pushed through the opening 28 with a small force, yet the ball shaped coupler 14 will not come out of the opening 28 unless the same amount of force is applied, thereby providing a "snap fit".

The rods 12 are flexible and semirigid. In the preferred embodiment, the distance between the cater 18 and the clip 20 is approximately the same as the distance between the radioactive source 10 and the ball-shaped coupler 14 on the rod 12. When the ball-shaped couplers 14 are received in the chambers 24 of the clip 20, the mounted radioactive sources 10 are restrained to remain in the compartments 22 of the canister 18.

The shaft 16 also is flexible and semirigid so that both the rods 12 and the shaft 16 will bend when the canister 18 is inserted through a curved passageway 30 leading to a given location in a shielded enclosure.

The compartments 22 in the canister 18 are dimensioned to enable free movement of the mounted radioactive sources 10 within the compartments 22 toward and away from the clip 20 when the rods 12 and the shaft 16 are flexed as a result of the canister 18 being moved through a curved passageway 30. The compartments 22 are slightly larger than the radioactive sources 10 both in diameter and length.

The chambers 24 in the clip 20 also are dimensioned to enable free movement of the ball-shaped couplers 14 within the chambers 24 toward and away from the canister 18 when the rods 12 and the shaft 16 are flexed as a result of the canister 18 being moved through a curved passageway 30. The chambers 24 are slightly larger than the ball-shaped couplers 14 in diameter.

By dimensioning the compartments 22 and/or the chambers 24 to enable free movement of the sources 10 and/or the ball-shaped couplers 14 within the compartments 22 and the chambers 24 respectively, the rods 12 can bend independently of each other when the apparatus 15 is deployed through the curved passageway 30 and thereby reduces the stiffness and binding effect that would occur during such deployment if the rods 12 were axially restrained so that they could not bend independently of each other.

Removal of the mounted radioactive sources 10 from the compartments 22 is prevented when the ball-shaped couplers 14 are received in the chambers 24 unless the rods 12 are flexed to a greater degree than the curvature of the passageway 30.

In a preferred embodiment of the method of the present invention, a plurality of radioactive sources 10 are simultaneously handled for deployment of the radioactive sources 10 from a shielded storage enclosure 32 by handling ends of the rods 12 having the ball-shaped couplers 14 outside of the shielded storage enclosure 32 while the mounted radioactive sources 10 are within the shielded storage enclosure 32 to respectively insert the mounted radioactive sources 10 through the openings 23 into the compartments 22 of the canister 18 and then inserting the ball-shaped couplers 14 through the openings 28 into the chambers 24 of the clip 20 to prevent removal of the mounted radioactive sources 10 from the compartments 22 of the canister 18.

The apparatus 15 is then handled by gripping a shaft 33 attached to the clip 20 to remove the canister 18 from the shielded storage enclosure 32 and to deploy the radioactive sources 10 through a curved passageway 30 in a second shielded enclosure 34 to a given location in the second shielded enclosure 34 at which the radioactive sources 10 are used as radioactive sources in some other apparatus (not shown), such a material analyzer, as described in U.S. Pat. No. 4,582,992.

As the canister 18 is pushed through the curved passageway 30, the rods 12 and the shaft 16 flex such that the mounted radioactive source 10 and the ball-shaped coupler 14 on the inwardly flexed side of the shaft 16 move deeper into their respective compartment 22 and chamber 24; and the ball-shaped coupler 14 on the outwardly flexed side of the shaft 16 move closer to the openings of their respective compartment 22 and chamber 24.

An alternative preferred embodiment for handling and deploying a single radioactive source is described with reference to FIGS. 1 and 5 through 7. In this embodiment, a ball-shaped coupler 14 at the end of a rod 12 having a radioactive source 10 mounted at the other end of the rod 12 is inserted into a chamber 38 defined by a clip 40 at the end of a shaft 42. The rod 12 and the shaft 42 are flexible and semirigid.

The clip 40 is made of flexible material and further defines an axial channel 44 having a diameter substantially smaller than the ball-shaped coupler 14 and approximately the same size as the neck 21. The axial channel 44 extends from an open end 46 to the chamber 38 for receiving the neck 21. The channel 44 is open to one side through a radial slot 48 which is slightly smaller than the neck 21 for permitting the neck 21 to be forced through the radial slot 48 and into the channel 44, such that when the ball-shaped coupler 14 is received in the chamber 38 the ball-shaped coupler 14 will not freely slide out of the chamber 38.

In a preferred embodiment of the method of the present invention for handling and deploying a single radioactive source 10, the end of the rod 12 having the ball-shaped coupler 14 is handled outside of a shielded storage enclosure while the mounted radioactive source 10 at the other end of the rod 12 is within the shielded storage enclosure to insert the neck 21 through the radial slot 48 so that the ball-shaped coupler 14 is received in the chamber 38 of the clip 40 at one end of the shaft 42.

The shaft 42 is then handled to remove the radioactive source 10 from the shielded storage enclosure and to deploy the radioactive source 10 through a curved passageway 50 in a second shielded enclosure 52 (FIG. 7) to a given location in the second shielded enclosure 52.

As the radioactive source 10 is pushed through the curved passageway 50, the rod 12 and the shaft 42 flex to enable deployment of the mounted radioactive source 10 through the curved passageway 50 to the given location.

I claim:

1. An apparatus for handling a plurality of radioactive sources respectively mounted at one end of a plurality of rods, wherein a coupler is disposed at the other end of each rod, the apparatus comprising a shaft having a canister defining a plurality of compartments at one end of the shaft for respectively receiving a plurality of said mounted radioactive sources, and a clip at another position on the shaft defining a plurality of chambers for respectively receiving a plurality of said couplers, such that the mounted radioactive sources are restrained to remain in the compartments when the couplers are received in said chambers.

2. An apparatus according to claim 1, wherein the rods and the shaft are flexible and semirigid.

3. An apparatus according to claim 2, wherein the compartments are dimensioned to enable movement of the mounted radioactive sources within the compartments toward and away from the clip when the rods and the shaft are flexed and/or the chambers are dimensioned to enable movement of the couplers within the chambers toward and away from the canister when the rods and the shaft are flexed.

4. An apparatus according to claim 1, wherein each chamber defines an opening at an end of the chamber facing the canister and a channel from said opening for enabling movement of the couplers in the chamber toward and away from said opening.

5. An apparatus for handling a plurality of radioactive sources, comprising a plurality of rods, each having a mounting for receiving a radioactive source at one end of the rod and a coupler at the other end of the rod;

a shaft having a canister defining a plurality of compartments at one end of the shaft for respectively receiving a plurality of said mounted radioactive sources, and a clip at another position on the shaft defining a plurality of chambers for respectively receiving a plurality of said couplers, such that the mounted radioactive sources are restrained to remain in the compartments when the couplers are received in said chambers.

6. An apparatus according to claim 5, wherein the rods and the shaft are flexible and semirigid.

7. An apparatus according to claim 6, wherein the compartments are dimensioned to enable movement of the mounted radioactive sources within the compartments toward and away from the clip when the rods and the shaft are flexed and/or the chambers are dimensioned to enable movement of the couplers within the chambers toward and away from the canister when the rods and the shaft are flexed.

8. An apparatus according to claim 5, wherein each chamber defines an opening at an end of the chamber facing the canister and a channel from said opening for enabling movement of the couplers in the chamber toward and away from said opening.

9. An apparatus for handling a radioactive source, comprising a rod having the radioactive source mounted at one end of the rod; and a coupling means disposed at the other end of the rod for coupling to a clip disposed on a shaft that has a canister disposed at one end of the shaft for receiving the radioactive source.

10. An apparatus according to claim 9, wherein the rod is flexible and semirigid.

11. An apparatus for handling a radioactive source, comprising a rod having the radioactive source mounted at one end of the rod;

a coupler disposed at the other end of the rod; and a shaft having a clip at one end of the shaft defining a chamber for receiving said coupler;

wherein the rod and the shaft are flexible and semirigid so that both the rod and shaft will flex when the rod and the shaft are inserted through a curved passageway leading to a given location in a shielded enclosure and thereby enable the radioactive source to be deployed through the curved passageway to and from the given location in the shielded enclosure.

12. An apparatus for handling a radioactive source, comprising a rod having the radioactive source mounted at one end of the rod;

a coupler disposed at the other end of the rod; and a shaft having a clip at one end of the shaft defining a chamber for receiving said coupler;

wherein the coupler includes a ball-shaped member having a larger diameter than the rod and the ball-shaped member is connected to the rod by a neck; and wherein the clip is made of flexible material and further defines and axial channel having a diameter smaller than the ball-shaped member and approximately the same size as the neck and extending from an open end to the chamber for receiving the neck, with the channel being open to one side through a radial slot which is smaller than the neck for permitting the neck to be forced through said radial slot and into said channel, such that when the ball-shaped member is received in the chamber the ball-shaped member will not freely slide out of the chamber.

13. A method of simultaneously handling a plurality of radioactive sources for deployment of the radioactive sources from a shielded enclosure, comprising the steps of:

a) providing a plurality of radioactive sources respectively mounted at one end of a plurality of rods, wherein a coupler is disposed at the other end of each rod;

b) handling the other ends of the rods outside of the shielded enclosure while the mounted radioactive sources are within the shielded enclosure to respectively insert the mounted radioactive sources in a plurality of compartments that are defined by a canister connected by a shaft to a clip defining a plurality of chambers for respectively receiving a plurality of said couplers, such that the mounted radioactive sources are restrained to remain in the compartments when the couplers are received in said chambers; and c) inserting the couplers into said chambers to prevent removal of the mounted radioactive sources from the compartments.

14. A method according to claim 13, further comprising the step of:

d) deploying the radioactive sources to a given location in a second shielded enclosure through a curved passageway in the second shielded enclosure;

wherein the rods and the shaft are flexible and semirigid for enabling deployment of the mounted radioactive sources through said curved passageway to said given location;

wherein the compartments are dimensioned to enable movement of the mounted radioactive sources within the compartments toward and away from the clip when the rods and the shaft are flexed and/or the chambers are dimensioned to enable movement of the couplers within the chambers toward and away from the canister when the rods and the shaft are flexed; and wherein removal of the mounted radioactive sources from the compartments is prevented when the ball-shaped couplers are received in the chambers unless the rods are flexed to a greater degree than the curvature of the passageway.

15. A method of handling a radioactive source for deployment of the radioactive source from a first shielded enclosure to a given location in a second shielded enclosure, comprising the steps of:

a) providing within the first shielded enclosure a radioactive source mounted at one end of a rod, wherein a coupler is disposed at the other end of the rod;

b) handling the other end of the rod outside of the first shielded enclosure while the mounted radioactive source is within the first shielded enclosure to insert the coupler into a chamber defined by a clip mounted at one end of a shaft; and c) handling the shaft to deploy the radioactive source to a given location in a second shielded enclosure through a curved passageway in the second shielded enclosure;

wherein the rod and the shaft are flexible and semirigid so that both the rod and shaft will flex when the rod and the shaft are inserted through the curved passageway leading to the given location in the second shielded enclosure and thereby enable the radioactive source to be deployed through the curved passageway to the given location in the shielded enclosure.

* * * * *